May 29, 1928.
H. K. HITCHCOCK
PLATE GLASS TRANSFER AND LAYING APPARATUS
Original Filed March 27, 1924  5 Sheets-Sheet 1
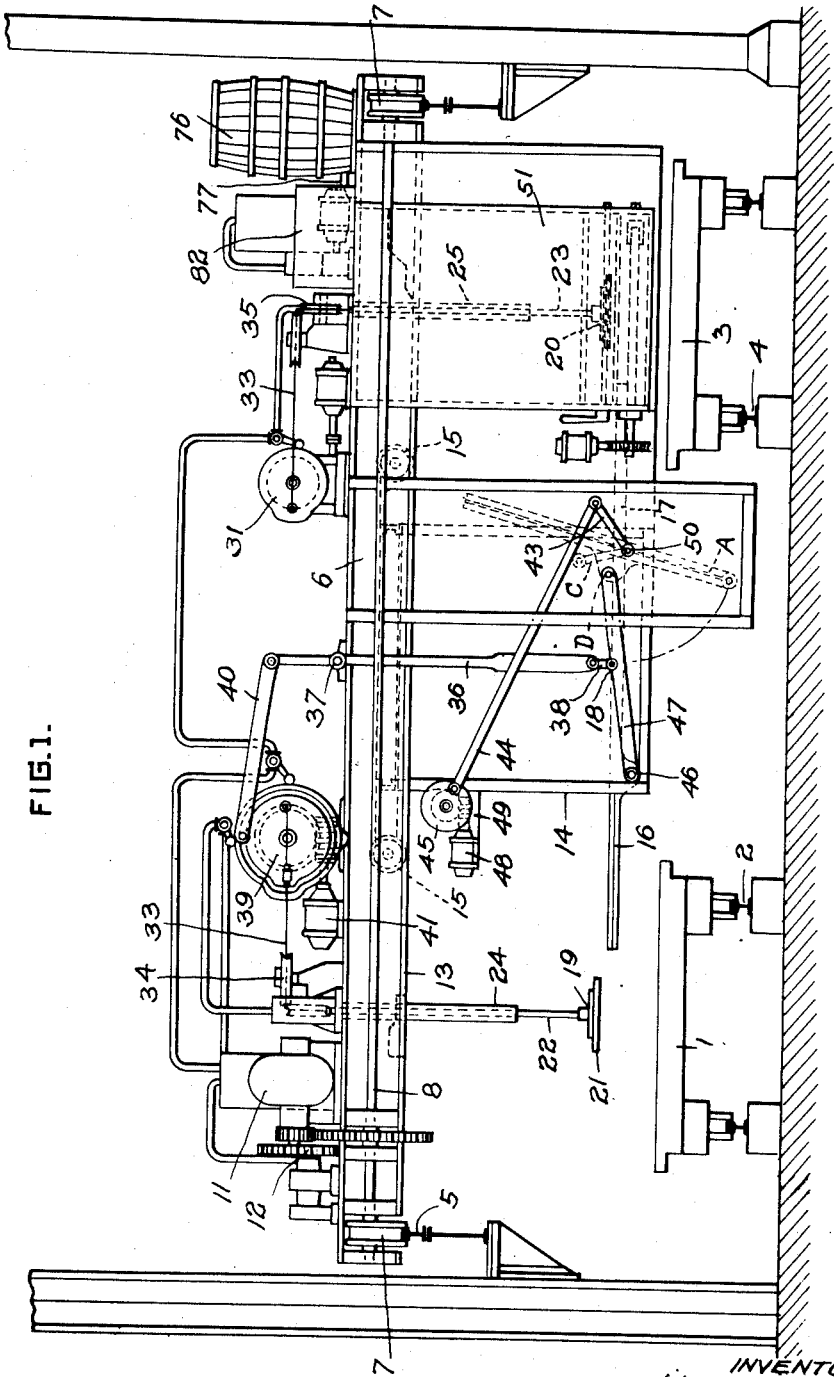

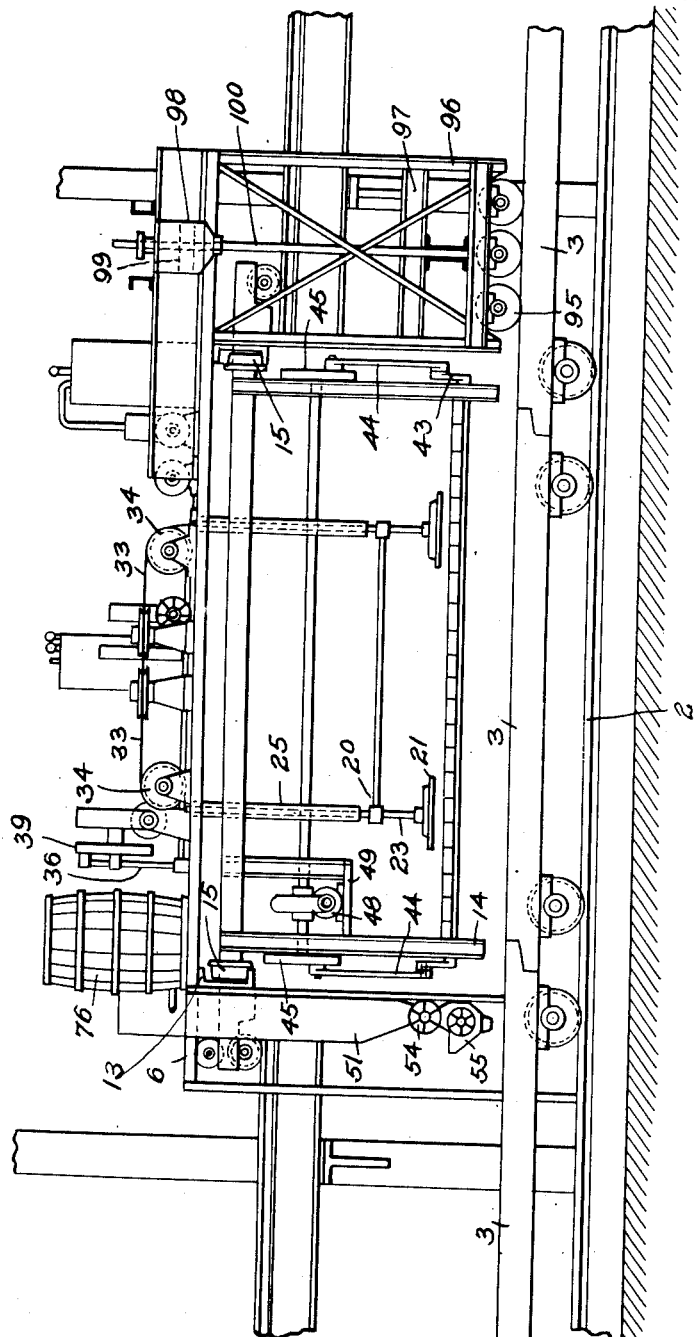

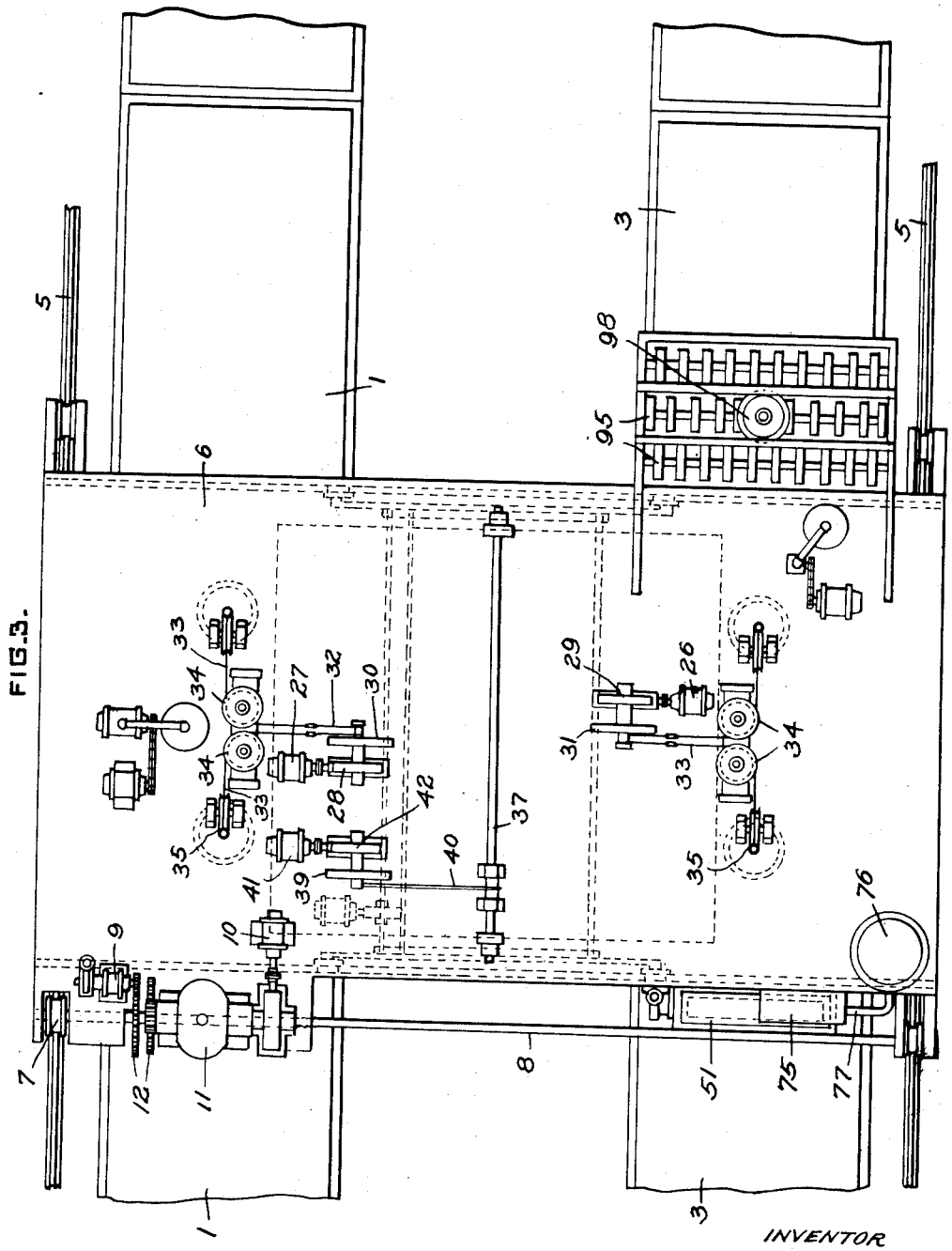

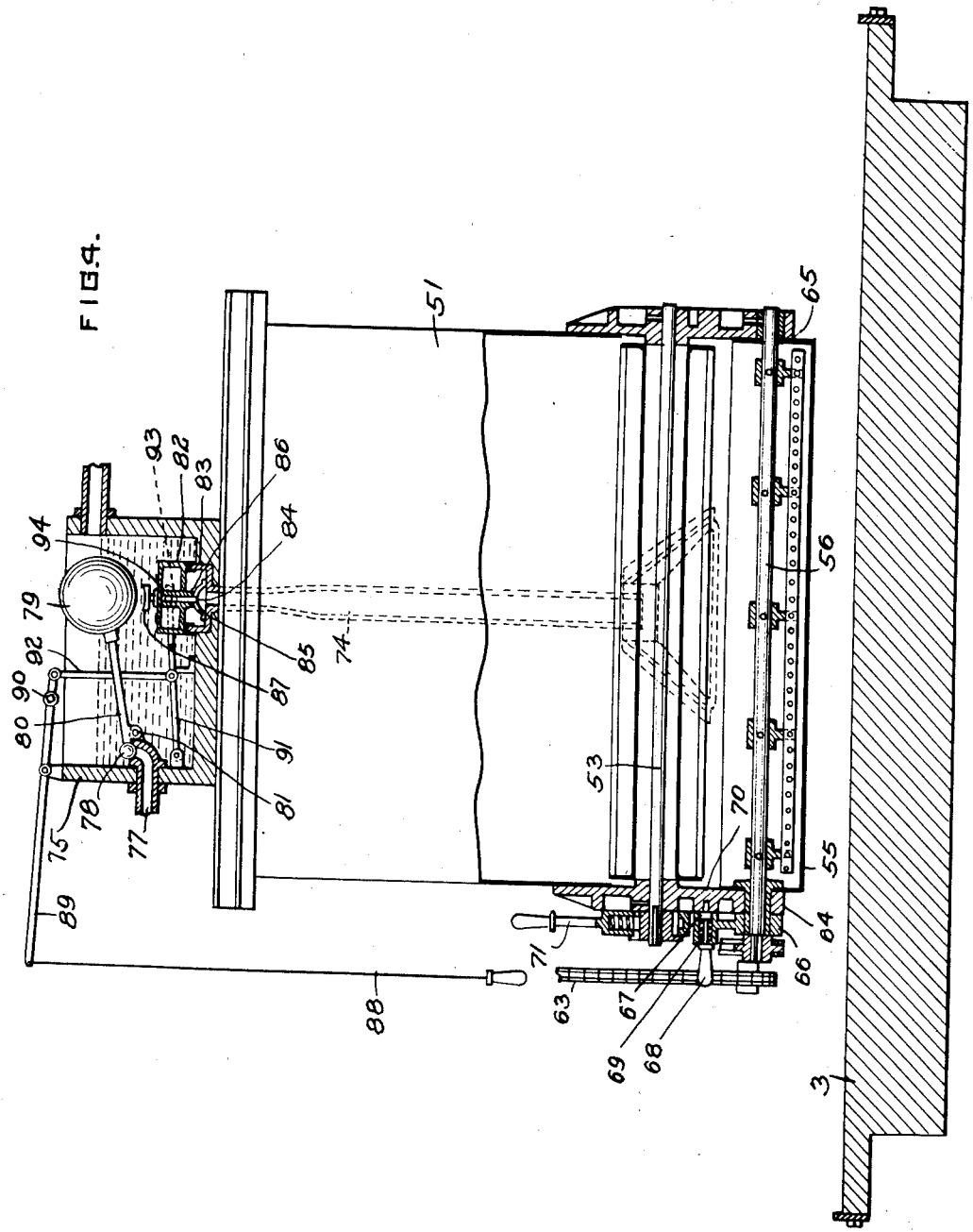

May 29, 1928.
H. K. HITCHCOCK
1,671,766
PLATE GLASS TRANSFER AND LAYING APPARATUS
Original Filed March 27, 1924    5 Sheets-Sheet 5
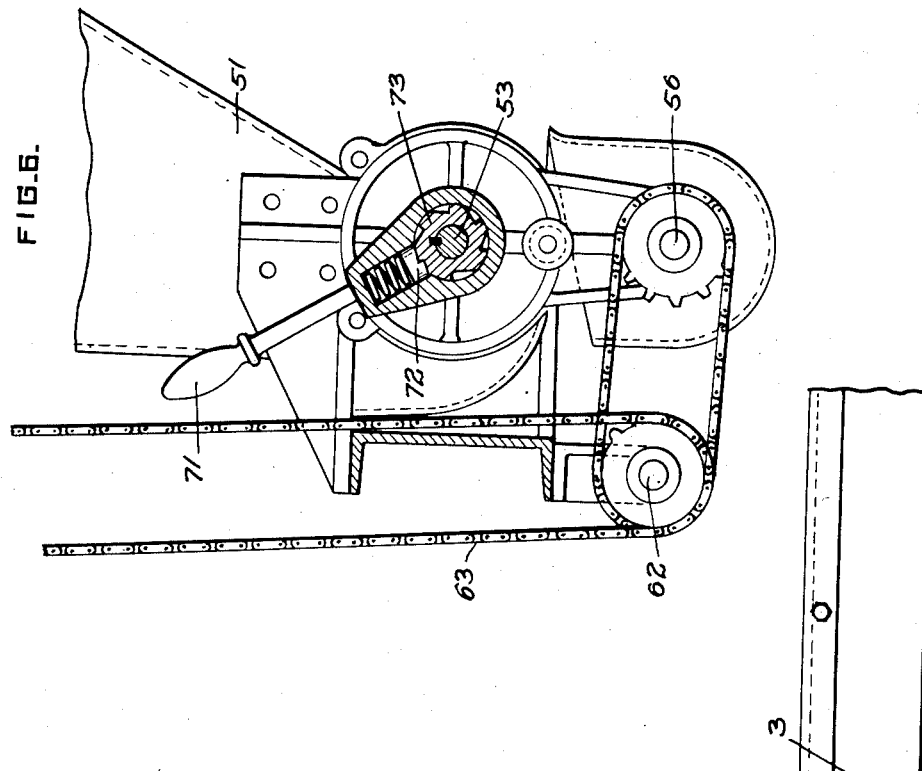
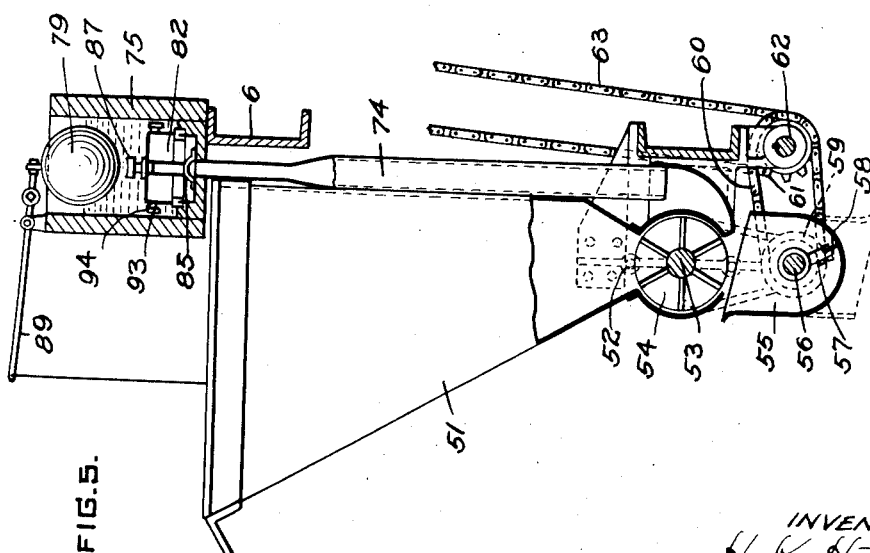
INVENTOR
H. K. Hitchcock
by
James C. Bradley
atty Patented May 29, 1928.

1,671,766

UNITED STATES PATENT OFFICE.

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA.

PLATE-GLASS TRANSFER AND LAYING APPARATUS.

Original application filed March 27, 1924, Serial No. 702,260. Divided and this application filed December 29, 1925. Serial No. 78,089.

The invention relates to apparatus for handling glass plates which have been ground and polished on one side and for "laying" the glass sheets in plaster after they have been turned over to bring the unsurfaced sides of the plates uppermost. The present application constitutes a division of my application, Serial No. 702,260, filed March 27, 1924. The invention has for its principal object the provision of improved means for accomplishing the application of the plaster and the laying of the glass from the overhead crane employed to position the sheets upon the surfacing tables, thus reducing the hand labor now required in applying the plaster to the tables and in properly seating the glass plates therein. The invention is particularly designed for use with a system such as that shown in the Fox Patent Number 1,554,804, in which the sheets of glass, after being surfaced on one side by grinders and polishers above one track carrying the work tables, are removed from the tables, turned over and applied to tables on a second parallel track preliminary to passing them beneath a second set of grinders and polishers; but it will be understood that the plaster applying and laying apparatus is not limited to use in this particular relation, and that such apparatus might be used for applying the plaster and laying the glass preliminary to surfacing the first sides of the sheets, or that it might be used in connection with other glass lifting and turnover devices. One embodiment of the invention is illustrated in the accompanying drawings, wherein:

Figs. 1, 2 and 3 are end and side elevation and plan views respectively of the complete apparatus. And Figs. 4, 5 and 6 are detail sections of the plaster mixer.

Referring to Figs. 1, 2 and 3, the reference numerals 1, 1, 1 indicate a series of cars or carriers mounted upon a track 2 and carrying the glass which has been ground and polished on one side in a straight away operation, and 3, 3, 3 are a similar series of cars mounted upon a track 4, which is parallel to the track 2, and to which the sheets of glass from the cars are to be transferred for the grinding and polishing of the rough unsurfaced sides. The apparatus for lifting the glass sheets from the cars 1, turning them upside down to bring the rough sides up, and placing them upon the tables 3 will only be briefly described, as this particular apparatus constitutes no part of the invention of the present application, such apparatus being described and claimed in said application, Serial No. 702,260, heretofore referred to.

Mounted upon the track 5 extending longitudinally of the tracks 2 and 4 is the framework 6 of the crane. The crane is provided with the wheels 7, 7 whose shaft or axle 8 is driven from a pair of motors 9 and 10 through the intermediary of gearing and a differential in the casing 11 and other gearing 12, as set forth in my application heretofore referred to. Extending transversely of the framework 6 of the crane is a trolley track 13 carrying the depending framework 14 which has the pairs of wheels 15 engaging the track. This framework carries a folding table made up of the two halves 16 and 17 pivoted together at 18 and adapted to fold up to the position indicated in dotted lines in order to turn over a sheet of glass which has been placed upon a part 16, so that when the table is again opened up, the glass will be positioned upon the part 17 with its rough side uppermost. The folding table is mounted so that it may be shifted laterally in both directions from the position shown, so that in one position, the part 16 lies below the vacuum frame 19 and in another position, the part 17 lies below the vacuum frame 20. A sheet of glass which has been raised by the vacuum frame 19 may, therefore, be placed upon the part 16, the table folded up to the position A to turn the glass over, and then unfolded and brought beneath the vacuum frame 20. After which the sheet may be lifted from the part 17 by the vacuum frame and when such part is shifted back to central position, the sheet may be lowered upon the table 3. The vacuum frames 19 and 20 each consist of two vacuum cups 21, 21 secured together by the frame and supported upon a pair of pipes 22, 23 guided for vertical movement in tubes 24, 25 depending from the framework of the crane. The frames are raised and lowered from the motors 26 and 27 mounted upon the framework of the crane and operating through reduced gearing in the casings 28 and 29 to rotate the crank discs 30 and 31. Cables 32 and 33 extend over suitable sheaves 34 and 35 and engage the upper ends of the pipes 22 and 23 which support the vacuum frames. Means are thus provided for raising and lowering the vacuum frames so that they may either engage the glass upon the tables 1 and 3, or may be lifted to the positions shown in Figs. 1 and 2, at which time the table sections 16 and 17 may be moved underneath the vacuum frames carrying the glass to receive it from such frames, as heretofore explained.

The folding table is swung back and forth from its central position, as shown in Fig. 1, by means of the levers 36 pivoted on the transverse shaft 37 and having their lower ends secured to the sides of the table at the pivot point 18 by means of the short link 38, as illustrated. The upper end of the lever 36 is operated from a crank disc 39 by means of the connecting rod 40. The crank disc 39 is itself rotated from the motor 41 through the intermediary of suitable reduction gearing in the gear casing 42.

The section 17 of the table carries a crank 43, and such crank is connected by means of the rod 44 with the crank disc 45. The section 16 has mounted on its lower side a transverse shaft carrying at its ends the rollers 46, mounted in the guide slots 47 in the side plates of the frame 14. The crank disc 45 is driven from the motor 48 through the intermediary of suitable reduction gearing, the motor and operating parts being all seated upon a bracket 49 carried by the trolley frame 14. The section 17 of the table has secured upon its lower side the shaft 50 mounted at its ends in the side plates of the frame 14. The rotation of the crank disc 45 through approximately 180 degrees brings the crank 43 to the dotted line position marked C, thus rotating the table sections to the position marked A and closing such sections with the rollers 46 at the right hand end of the guide slots 47, as indicated in dotted lines at D. The slots 47, during such movement, serve to guide the section 16 laterally, while the pivotal connection 46 between the two table sections is swung downwardly to the position A indicated in dotted lines. This movement brings the frame past a vertical position, so that when it is opened by reversing the motor 48, the glass will rest upon the section 17 with its rough side, which was formerly down, facing up. The table is then moved to the right, as heretofore explained, to bring it beneath the vacuum frame 20, after which the glass is lifted by such vacuum frame and deposited upon the grinding and polishing table 3, the folding table being at such time moved to the left and out of the way to permit such operation.

The apparatus also includes means for applying plaster to the tables 3, preliminary to laying the glass thereon and means for rolling the glass into the plaster, such apparatus constituting the subject matter to which the present application is particularly directed. These two sets of mechanism are preferably mounted upon the platform, as indicated in Fig. 2, on opposite sides of the vacuum frame 20, the arrangement being such that after the platform carrying the plaster applying apparatus is moved longitudinally of the table 3 to apply a layer of plaster thereto, the turnover table and vacuum frame may be moved to the position, as indicated in Fig. 1, and the glass sheet lowered into the plaster, after which a movement of the platform to the left (Fig. 2) carries the rolling apparatus over the sheet of glass to press it down uniformly so that its upper side lies in substantially a horizontal plane. The plaster mixing and applying device is shown in Figs. 4 and 5. This apparatus includes a hopper 51 provided at its lower end with a discharge outlet 52 leading to a rotary valve. This valve comprises a shaft 53 mounted for rotation and has a plurality of pockets 54, which are filled in turn as the valve is rotated step by step. Beneath the valve is an upwardly opening trough 55 mounted for tilting movement around the shaft 56. The shaft 56 also carries a stirring and cleaning paddle 57 having a rubber lip 58 which presses yieldingly against the interior surface of the trough. The shaft is provided at its end with a sprocket 59 and this sprocket is rotated by the chain 60 passing around the sprocket 61 on the shaft 62. The shaft 62 is driven from any suitable source of power by means of a sprocket chain 63. The trough 55 is supported for rotation on the shaft 56 by means of the sleeves 64 and 65 (Fig. 4) and the sleeve 64 has keyed thereto an arm 66 held in the position illustrated in Figs. 4 and 6 by means of the latch 67 having a retracting handle 68 and a spring 69 normally pressing the latch forward into a recess in the housing 70. When it is desired to discharge the trough to the table, the latch 67 is pulled outward and the trough swung around 180 degrees to the dotted line position indicated in Fig. 5. The valve 55 is operated by means of a handle 71 (Fig. 6) provided with a spring pressed pawl 72 engaging a ratchet 73 keyed to the shaft 53.

Water is supplied to the trough by means of an outlet pipe 74 leading from the tank 75. The tank itself is supplied from a main or from a large tank 76 carried by the crane platform 7 through the inlet pipe 77. This pipe has an upwardly turned end closed by the valve 78 and this valve is operated from the float 79 carried by the valve rod 80 pivoted at 81. The upper end of the outlet pipe 74 is closed by the valve 82 which is in the form of a float whose lower free edge engages the seat 83 surrounding the upper end of the pipe 74. A guide for the valve is provided in the form of a pin 84 carried by the spider 85 secured to the bottom of the member 83. The valve 82 has a sleeve 86 which fits over this pin, so that it is guided in its vertical movement. Carried by the upper end of the valve 82 is a rest or seat 87 for engaging the float 79 when the valve 82 is opened. The valve 82 is opened from the cable or chain 88 which is attached to the outer end of the lever 89, such lever being provided with a counterweight 90, and being connected at its inner end to the lever 91 by means of the rod 92. The lever 91 has its free end forked, as indicated at 93, and this forked end engages pins 94 projecting laterally from the side of the valve 82. When the chain 88 is pulled downwardly, the valve 82 is lifted and the rest 87 engages the lower side of the float 79. Water in the tank now flows downwardly through the pipe 74 until the lever in the tank has dropped to a point such that the valve 82 will seat itself and during this period of emptying, the valve 78 is held closed because of the support afforded the float 79 by the seat or rest 87 carried by the float valve 82. In this manner, the quantity of water supplied is accurately controlled, since there is no inflow into the tank during the period of discharge therefrom. This function is secured by reason of the support of the float 79 by the float valve 82, as otherwise the float 79 would open the valve 78 as soon as the level of the water in the tank began to drop.

In operating the apparatus, the plaster valve is first rotated to discharge a measured quantity of plaster into the trough 55, after which the chain 88 is pulled, permitting a supply of water to the trough sufficient to make a mixture of the right consistency. The mechanism for rotating the shaft 56 is then started, so that the paddle 57 revolves, thoroughly mixing the plaster and water, after which the handle 68 is pulled out, and the trough rotated to discharge onto the table. At the same time, the crane platform is moved longitudinally of the tracks so that the mixture of plaster and water is distributed over the length of the car.

The means for pressing the sheet of glass down in the plaster consists of the rolls 95 shown in Figs. 2 and 3, such rolls being guided for vertical movement with respect to the platform by means of the guide frame 96, which engages the frame 97 in which the rolls are mounted. The frame 97 may be moved up and down and the pressure of such rolls governed by means of the air cylinder 98, whose plunger 99 is provided with a piston rod 100 connected at its lower end to the frame 97. Any other desired means may be employed for governing the movement of the frame 97, and the weight of the frame and rolls themselves may be made such as to apply just the desired amount of pressure to the glass. The rolls are applied to the glass by moving the platform to the left (Fig. 2), so as to carry them over the glass sheet, such glass sheet having been applied by means of the vacuum frame 20 after the discharge of plaster to the table.

What I claim is:

1. In combination in apparatus for laying glass sheets on a series of cars or carriers mounted on a track, of a crane mounted over the track for movement longitudinally of the track, a plaster mixing and applying apparatus carried by the crane, and roller means carried by the crane for pressing the glass sheets into the plaster.

2. In combination in apparatus for laying glass sheets on a series of cars or carriers mounted on a track, of a crane mounted over the track for movement longitudinally of the track, a plaster mixing and applying apparatus carried by the crane, roller means carried by the crane for pressing the glass sheets into the plaster and means for regulating the vertical position of the roller means.

3. In combination in apparatus for laying glass sheets on a series of cars or carriers, of a hopper for plaster mounted over the track, a valve for removing a measured quantity of plaster from the hopper, a mixer for receiving the plaster extending transversely of the cars or carriers, means for supplying a measured quantity of water to the mixer and means for discharging the mixture to the car or carrier therebeneath.

4. In combination in apparatus for laying glass sheets on a series of cars or carriers, of a hopper for plaster mounted over the track, a valve for removing a measured quantity of plaster from the hopper, an upwardly opening mixer trough for receiving the plaster extending across the cars or carriers and mounted for tilting movement around an axis extending transversely of the car or carrier therebeneath, and means for supplying a measured quantity of water to the mixer.

5. In combination in apparatus for laying glass sheets on a series of cars or carriers, of a hopper for plaster mounted over the track, a valve for removing a measured quantity of plaster from the hopper, an upwardly opening mixer trough for receiving the plaster extending across the cars or carriers and mounted for tilting movement around an axis extending transversely of the car or carrier therebeneath, a combined mixer and scraper mounted for rotation in the trough around said axis and engaging the inner surface thereof, and means for supplying a measured quantity of water to the trough preliminary to rotating it about its axis to discharge it to the car or carrier therebeneath.

6. In combination in apparatus for laying glass sheets on a series of cars or carriers, of a hopper for plaster mounted over the track, a valve member extending beneath the lower end of the hopper and comprising a rotary member provided with a plurality of radial pockets for receiving the plaster, a trough beneath the valve member for receiving the charges of plaster when the valve member is rotated, means for supplying water to the trough, and means for discharging the mixture in the trough to the car or carrier thereneath.

7. In combination in apparatus for laying glass sheets on a series of cars or carriers, of a hopper for plaster mounted over the track, a valve for removing a measured quantity of plaster from the hopper, a mixer for receiving the plaster extending transversely of the cars or carriers, a water tank also mounted above the track and provided with an inlet connected to a source of water supply and an outlet leading to said tank, an inlet valve and an operating float for closing the valve when the tank has filled to a predetermined level, a valve for closing said outlet, manually operated means for opening it, and a float connected thereto arranged to hold the inlet valve closed until the outlet valve has closed.

8. In combination in apparatus for laying glass sheets on a series of cars or carriers, of a hopper for plaster mounted over the track, a valve for removing a measured quantity of plaster from the hopper, a mixer for receiving the plaster extending transversely of the cars or carriers, a water tank also mounted above the track and provided with an inlet connected to a source of water supply and an outlet leading to said tank, an inlet valve and an operating float for closing the valve when the tank has filled to a predetermined level, a valve for closing said outlet, located beneath said float and opening upwardly, manually operated means for opening it, a float carried by said outlet valve and lying intermediate such valve and the first float, and means carried by the second float for engaging the first float and preventing its downward movement until the water in the tank is lowered in level so as to permit the outlet valve to seat.

9. In combination in apparatus for laying glass sheets on a series of cars or carriers mounted on a track, of a crane mounted over the track for movement longitudinally thereof, a laying apparatus carried by the crane, for depositing the glass sheets upon the cars, a plaster mixing and applying apparatus carried by the crane, and presser means also carried by the crane for pressing the glass sheets into the plaster.

In testimony whereof, I have hereunto subscribed my name this 28th day of December, 1925.

HALBERT K. HITCHCOCK.